US012672115B2

(12) United States Patent
Yang et al.

(10) Patent No.: US 12,672,115 B2
(45) Date of Patent: Jun. 30, 2026

(54) UPLINK INFORMATION TRANSMISSION METHOD, UPLINK INFORMATION RECEPTION METHOD, USER EQUIPMENT, AND NETWORK DEVICE

(71) Applicant: DATANG MOBILE COMMUNICATIONS EQUIPMENT CO., LTD., Beijing (CN)

(72) Inventors: Meiying Yang, Beijing (CN); Jiaqing Wang, Beijing (CN); Fangchen Cheng, Beijing (CN); Chen Luo, Beijing (CN); Yinghao Zhang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 313 days.

(21) Appl. No.: 18/697,264

(22) PCT Filed: Sep. 9, 2022

(86) PCT No.: PCT/CN2022/122586
§ 371 (c)(1),
(2) Date: Mar. 29, 2024

(87) PCT Pub. No.: WO2023/051689
PCT Pub. Date: Apr. 6, 2023

(65) Prior Publication Data
US 2024/0414699 A1 Dec. 12, 2024

(30) Foreign Application Priority Data
Sep. 30, 2021 (CN) .......................... 202111160818.6

(51) Int. Cl.
H04W 72/0446 (2023.01)
H04L 5/00 (2006.01)

(52) U.S. Cl.
CPC ....... H04W 72/0446 (2013.01); H04L 5/0053 (2013.01)

(58) Field of Classification Search
None
See application file for complete search history.

(56) References Cited

U.S. PATENT DOCUMENTS 11,985,677 B2 5/2024 Yang et al.
2019/0254021 A1* 8/2019 Hosseini ........... H04W 72/1268
(Continued)

FOREIGN PATENT DOCUMENTS

JP 2021-521710 A 8/2021
WO 2020/032761 A1 2/2020

OTHER PUBLICATIONS

Extended European Search Report issued Jan. 8, 2025 in European Application No. 22875071.7.
(Continued)

*Primary Examiner* — Angela Nguyen
(74) *Attorney, Agent, or Firm* — Harness, Dickey & Pierce, P.L.C.

(57) ABSTRACT

An uplink information transmission method, an uplink information reception method, a UE and a network device are provided. The uplink information transmission method includes: receiving, by the UE, target DCI, the target DCI being used to indicate time information of at least one of first uplink information or second uplink information; and transmitting, by the UE, the first uplink information and the second uplink information in accordance with the target DCI, wherein the first uplink information and the second uplink information are transmitted at a same moment, or a time interval between a transmission time of the first uplink (Continued)

information and a transmission time of the second uplink information is smaller than or equal to a predefined time interval.

20 Claims, 4 Drawing Sheets

(56) References Cited

U.S. PATENT DOCUMENTS

| | | |
|---|---|---|
| 2019/0320431 A1 | 10/2019 | Huang et al. |
| 2020/0275476 A1 | 8/2020 | Yang et al. |
| 2020/0344788 A1 * | 10/2020 | Li ......................... H04L 5/0042 |
| 2021/0058924 A1 | 2/2021 | Huang et al. |
| 2021/0266953 A1 * | 8/2021 | Pelletier ............... H04L 1/0001 |
| 2021/0329684 A1 | 10/2021 | Yang et al. |

OTHER PUBLICATIONS

Notice of Reasons for Refusal issued Dec. 3, 2024 in Japanese Application No. 2024-519687.
Request for the submission of an Opinion issued Jan. 21, 2026 in Korean Application No. 10-2024-7013678.
Moderator (Apple Inc.), "Summary #2 of [101-e-NR-L1enh-URLLC-PUSCH-02] (AI 7.2.5.3)," 3GPP TSG-RAN WG1 Meeting #101-e, R1-2004981, May 25, 2020.
Huawei, HiSilicon, "Feature Summary of Enhancements on Multi-TRP/Panel Transmission," 3GPP TSG RAN WG1 Meeting #99, R1-1913299, Nov. 18, 2019.

* cited by examiner

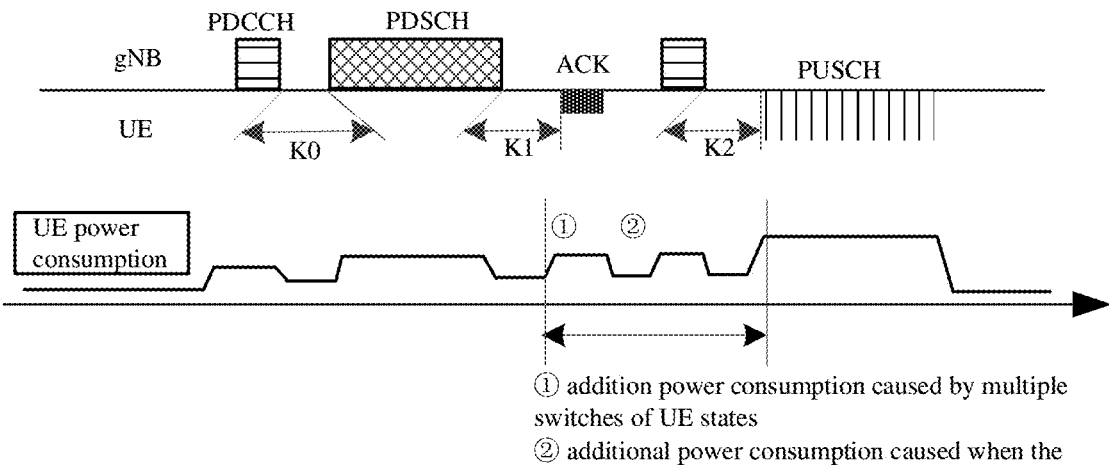
① addition power consumption caused by multiple switches of UE states
② additional power consumption caused when the UE is awaken frequently and a sleep time is reduced
Fig. 1
22
network device
21
UE
Fig. 2
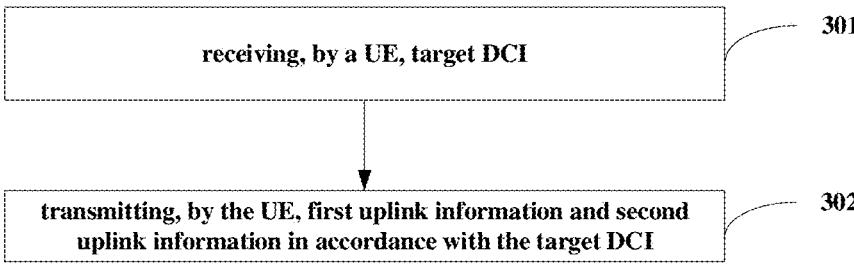
receiving, by a UE, target DCI — 301
transmitting, by the UE, first uplink information and second uplink information in accordance with the target DCI — 302
Fig. 3

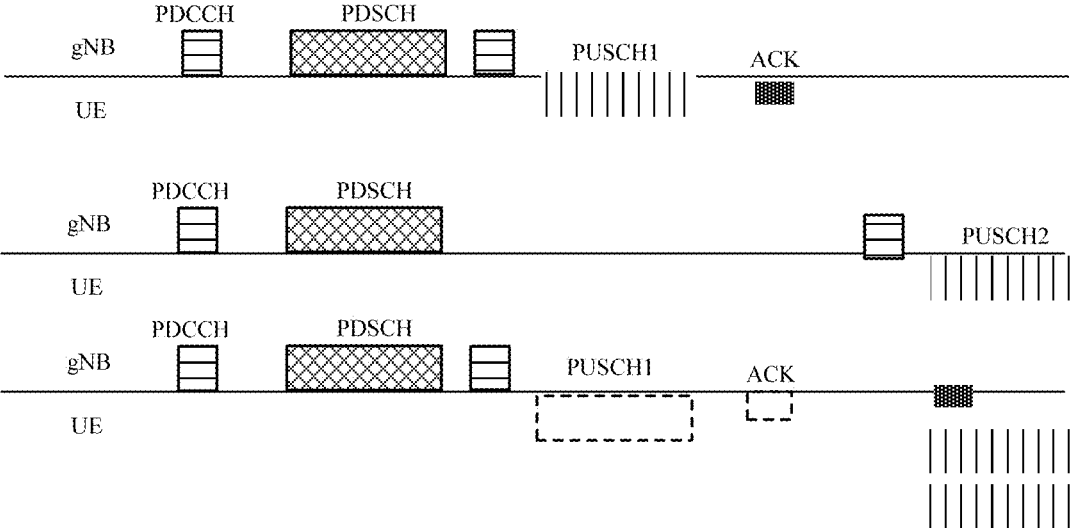
Fig. 7
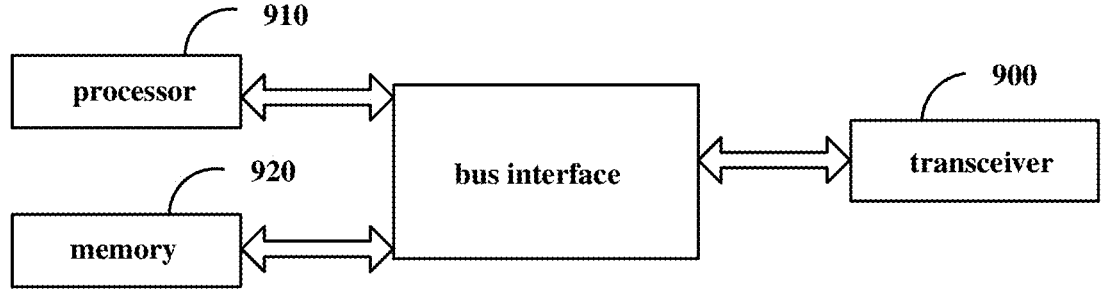
Fig. 8
Fig. 9

1000

1100

1

UPLINK INFORMATION TRANSMISSION METHOD, UPLINK INFORMATION RECEPTION METHOD, USER EQUIPMENT, AND NETWORK DEVICE

CROSS-REFERENCE TO RELATED APPLICATIONS

This application is the U.S. national phase of PCT Application No. PCT/CN2022/122586 filed on Sep. 29, 2022, which claims a priority of the Chinese patent application No. 202111160818.6 filed in China on Sep. 30, 2021, the disclosures of each of which are incorporated herein by reference in their entireties entirely.

TECHNICAL FIELD

The present disclosure relates to the field of communication technology, in particular to an uplink information transmission method, an uplink information reception method, a User Equipment (UE), and a network device.

BACKGROUND

In a communication system, for some services, uplink information is more intensive than downlink information. For example, in an extended Reality (XR) service, the uplink information is transmitted more intensively than the downlink information. Hence, when the information is received or transmitted at different time points, addition power consumption is caused by waiting for the reception or transmission and caused by switching a UE state, and thereby the intensive transmission of the uplink information leads to large power consumption of a UE.

SUMMARY

An object of the present disclosure is to provide an uplink information transmission method, an uplink information reception method, a UE and a network device, so as to reduce power consumption of the UE.

In one aspect, the present disclosure provides in some embodiments an uplink information transmission method, including: receiving, by a UE, target Downlink Control Information (DCI), the target DCI being used to indicate time information of at least one of first uplink information or second uplink information; and transmitting, by the UE, the first uplink information and the second uplink information in accordance with the target DCI. The first uplink information and the second uplink information are transmitted at a same moment, or a time interval between a transmission time of the first uplink information and a transmission time of the second uplink information is smaller than or equal to a predefined time interval.

Optionally, the first uplink information includes Physical Downlink Shared Channel (PDSCH) Acknowledgement (ACK), and the second uplink information includes data carried on a first Physical Uplink Shared Channel (PUSCH).

Optionally, the target DCI is used to indicate at least one of the transmission time of the first uplink information, the transmission time of the second uplink information, a transmission time interval between the first uplink information and first target information, or a transmission time interval between the second uplink information and second target information.

Optionally, the target DCI includes at least one of first time information of the first uplink information or second time information of the second uplink information, the first time information is used to indicate at least one of the transmission time of the first uplink information or the transmission time interval between the first uplink information and the first target information, and the second time information is used to indicate at least one of the transmission time of the second uplink information or the transmission time interval between the second uplink information and the second target information.

Optionally, the target DCI includes third time information, and the third time information is used to indicate at least one of: at least one of the transmission time of the first uplink information or the transmission time interval between the first uplink information and the first target information; or at least one of the transmission time of the second uplink information or the transmission time interval between the second uplink information and the second target information.

Optionally, the transmission time interval between the first uplink information and the first target information includes at least one of a transmission time interval between a target PDSCH and the first uplink information, a transmission time interval between the target DCI and the first uplink information, or a transmission time interval between the second uplink information and the first uplink information.

Optionally, the transmission time interval between the second uplink information and the second target information includes at least one of a transmission time interval between the target DCI and the second uplink information, the transmission time interval between the first uplink information and the second uplink information, or a transmission time interval between the second uplink information and a target PDSCH.

Optionally, the target DCI includes at least one of first DCI for simultaneously scheduling Downlink (DL) transmission and Uplink (UL) transmission, second DCI for scheduling the DL transmission, or third DCI for scheduling the UL transmission.

Optionally, the second DCI includes first time information of the first uplink information, and the third DCI includes second time information of the second uplink information; or the second DCI includes second time information of the second uplink information, and the third DCI includes first time information of the first uplink information; or the second DCI includes first time information of the first uplink information and second time information of the second uplink information; or the third DCI includes second time information of the second uplink information and first time information of the first uplink information.

Optionally, the second DCI is further used for time information for scheduling the UL transmission, and/or the third DCI is further used for time information for scheduling the DL transmission.

In another aspect, the present disclosure provides in some embodiments an uplink information reception method, including: transmitting, by a network device, target DCI, the target DCI being used to indicate time information of at least one of first uplink information or second uplink information; and receiving, by the network device, the first uplink information and the second uplink information in accordance with the target DCI. The first uplink information and the second uplink information are transmitted at a same moment, or a time interval between a transmission time of the first uplink information and a transmission time of the second uplink information is smaller than or equal to a predefined time interval.

Optionally, the first uplink information includes PDSCH ACK, and the second uplink information includes data carried on a first PUSCH.

Optionally, the target DCI is used to indicate at least one of the transmission time of the first uplink information, the transmission time of the second uplink information, a transmission time interval between the first uplink information and first target information, or a transmission time interval between the second uplink information and second target information.

Optionally, the target DCI includes at least one of first time information of the first uplink information or second time information of the second uplink information, the first time information is used to indicate at least one of the transmission time of the first uplink information or the transmission time interval between the first uplink information and the first target information, and the second time information is used to indicate at least one of the transmission time of the second uplink information or the transmission time interval between the second uplink information and the second target information.

Optionally, the target DCI includes third time information, and the third time information is used to indicate at least one of: at least one of the transmission time of the first uplink information or the transmission time interval between the first uplink information and the first target information; or at least one of the transmission time of the second uplink information or the transmission time interval between the second uplink information and the second target information.

Optionally, the transmission time interval between the first uplink information and the first target information includes at least one of a transmission time interval between a target PDSCH and the first uplink information, a transmission time interval between the target DCI and the first uplink information, or a transmission time interval between the second uplink information and the first uplink information.

Optionally, the transmission time interval between the second uplink information and the second target information includes at least one of a transmission time interval between the target DCI and the second uplink information, the transmission time interval between the first uplink information and the second uplink information, or a transmission time interval between the second uplink information and a target PDSCH.

Optionally, the target DCI includes at least one of first DCI for simultaneously scheduling DL transmission and UL transmission, second DCI for scheduling the DL transmission, or third DCI for scheduling the UL transmission.

Optionally, the second DCI includes first time information of the first uplink information, and the third DCI includes second time information of the second uplink information; or the second DCI includes second time information of the second uplink information, and the third DCI includes first time information of the first uplink information; or the second DCI includes first time information of the first uplink information and second time information of the second uplink information; or the third DCI includes second time information of the second uplink information and first time information of the first uplink information.

Optionally, the second DCI is further used for time information for scheduling the UL transmission, and/or the third DCI is further used for time information for scheduling the DL transmission.

In another aspect, the present disclosure provides in some embodiments a UE, including a memory, a transceiver and a processor. The memory is configured to store therein a computer program, and the transceiver is configured to receive and transmit data under the control of the processor. The processor is configured to read the computer program in the memory to: receive target DCI, the target DCI being used to indicate time information of at least one of first uplink information or second uplink information; and transmit the first uplink information and the second uplink information in accordance with the target DCI, wherein the first uplink information and the second uplink information are transmitted at a same moment, or a time interval between a transmission time of the first uplink information and a transmission time of the second uplink information is smaller than or equal to a predefined time interval.

Optionally, the first uplink information includes PDSCH ACK, and the second uplink information includes data carried on a first PUSCH.

Optionally, the target DCI is used to indicate at least one of the transmission time of the first uplink information, the transmission time of the second uplink information, a transmission time interval between the first uplink information and first target information, or a transmission time interval between the second uplink information and second target information.

Optionally, the target DCI includes at least one of first time information of the first uplink information or second time information of the second uplink information, the first time information is used to indicate at least one of the transmission time of the first uplink information or the transmission time interval between the first uplink information and the first target information, and the second time information is used to indicate at least one of the transmission time of the second uplink information or the transmission time interval between the second uplink information and the second target information.

Optionally, the target DCI includes third time information, and the third time information is used to indicate at least one of: at least one of the transmission time of the first uplink information or the transmission time interval between the first uplink information and the first target information; or at least one of the transmission time of the second uplink information or the transmission time interval between the second uplink information and the second target information.

Optionally, the target DCI includes at least one of first DCI for simultaneously scheduling DL transmission and UL transmission, second DCI for scheduling the DL transmission, or third DCI for scheduling the UL transmission.

Optionally, the second DCI includes first time information of the first uplink information, and the third DCI includes second time information of the second uplink information; or the second DCI includes second time information of the second uplink information, and the third DCI includes first time information of the first uplink information; or the second DCI includes first time information of the first uplink information and second time information of the second uplink information; or the third DCI includes second time information of the second uplink information and first time information of the first uplink information.

In still yet another aspect, the present disclosure provides in some embodiments a network device, including a memory, a transceiver and a processor. The memory is configured to store therein a computer program, and the transceiver is configured to receive and transmit data under the control of the processor, wherein the processor is configured to read the computer program in the memory to: transmit target DCI, the target DCI being used to indicate time information of at least one of first uplink information or second uplink information; and receive the first uplink information and the second uplink information in accordance with the target DCI. The first uplink information and the second uplink information are transmitted at a same moment, or a time interval between a transmission time of the first uplink information and a transmission time of the second uplink information is smaller than or equal to a predefined time interval.

Optionally, the first uplink information includes PDSCH ACK, and the second uplink information includes data carried on a first PUSCH.

Optionally, the target DCI is used to indicate at least one of the transmission time of the first uplink information, the transmission time of the second uplink information, a transmission time interval between the first uplink information and first target information, or a transmission time interval between the second uplink information and second target information.

Optionally, the target DCI includes at least one of first time information of the first uplink information or second time information of the second uplink information, the first time information is used to indicate at least one of the transmission time of the first uplink information or the transmission time interval between the first uplink information and the first target information, and the second time information is used to indicate at least one of the transmission time of the second uplink information or the transmission time interval between the second uplink information and the second target information.

Optionally, the target DCI includes third time information, wherein the third time information is used to indicate at least one of: at least one of the transmission time of the first uplink information or the transmission time interval between the first uplink information and the first target information; or at least one of the transmission time of the second uplink information or the transmission time interval between the second uplink information and the second target information.

Optionally, the target DCI includes at least one of first DCI for simultaneously scheduling DL transmission and UL transmission, second DCI for scheduling the DL transmission, or third DCI for scheduling the UL transmission.

In still yet another aspect, the present disclosure provides in some embodiments a UE, including: a reception unit configured to receive target DCI, the target DCI being used to indicate time information of at least one of first uplink information or second uplink information; and a transmission unit configured to transmit the first uplink information and the second uplink information in accordance with the target DCI. The first uplink information and the second uplink information are transmitted at a same moment, or a time interval between a transmission time of the first uplink information and a transmission time of the second uplink information is smaller than or equal to a predefined time interval.

In still yet another aspect, the present disclosure provides in some embodiments a network device, including: a transmission unit configured to transmit target DCI, the target DCI being used to indicate time information of at least one of first uplink information or second uplink information; and a reception unit configured to receive the first uplink information and the second uplink information in accordance with the target DCI. The first uplink information and the second uplink information are transmitted at a same moment, or a time interval between a transmission time of the first uplink information and a transmission time of the second uplink information is smaller than or equal to a predefined time interval.

In still yet another aspect, the present disclosure provides in some embodiments a processor-readable storage medium storing therein a computer program. The computer program is executed by a processor so as to implement the above-mentioned uplink information transmission method or uplink information reception method.

According to the embodiments of the present disclosure, the UE receives the target DCI, and the target DCI is used to indicate the time information of at least one of first uplink information or second uplink information. Then, the UE transmits the first uplink information and the second uplink information in accordance with the target DCI. The first uplink information and the second uplink information are transmitted at a same moment, or the time interval between the transmission time of the first uplink information and the transmission time of the second uplink information is smaller than or equal to the predefined time interval. As a result, it is able to effectively increase a sleep time of the UE and reduce power consumption for switching, thereby to reduce the power consumption of the UE.

BRIEF DESCRIPTION OF THE DRAWINGS

FIG. 1 is a schematic view showing information transmission according to an embodiment of the present disclosure;

FIG. 2 is a schematic view showing applicable network architecture according to an embodiment of the present disclosure;

FIG. 3 is a flow chart of an uplink information transmission method according to an embodiment of the present disclosure;

FIG. 7 is yet another schematic view showing the information transmission according to an embodiment of the present disclosure;

FIG. 8 is a block diagram of a UE according to an embodiment of the present disclosure;

FIG. 9 is a block diagram of a network device according to an embodiment of the present disclosure;

DETAILED DESCRIPTION

Figure 4:
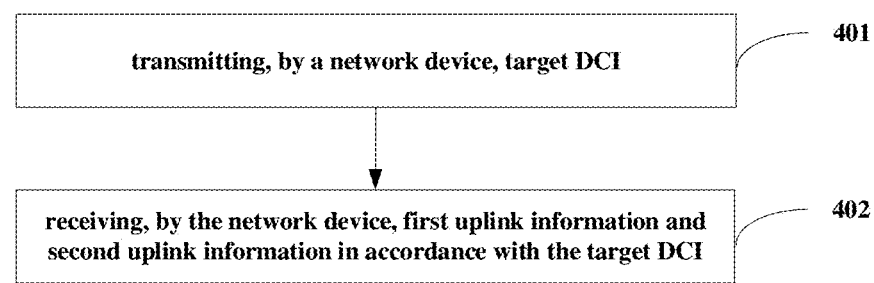
FIG. 4 is a flow chart of an uplink information reception method according to an embodiment of the present disclosure.

In the related art, K1 and K2 are used to indicate a time interval between a PDSCH and an ACK, and a time interval between DCI and a PUSCH respectively. K1 and K2 are configured independently and carried in different DCI formats, and thereby K1 and K2 have different numerical ranges. A UE needs to be awakened in accordance with timing of the configured K1 and K2, so as to transmit the ACK and the PUSCH accordingly.

For periodic DL and UL services, when they arrive at different moments, the UE needs to be awakened to receive or transmit DL relevant information or UL relevant information. When the information is received or transmitted at different moments, addition power consumption is caused by waiting for the reception or transmission and caused by switching a UE state. For the periodic service, the power consumption exists continuously and periodically, so it is greater than that for the transmission of a non-XR service. Especially for the UL transmission, the service arrives more intensively, and additional power consumption caused by the transmission of the ACK for the DL data and the UL data is larger. As shown in FIG. 1, the additional power consumption is caused when the UE states are switched for multiple times between the ACK and the PUSCH, and the UE is awakened frequently, so a sleep time of the UE is decreased and additional power consumption is introduced.

Based on the above-mentioned problems and analyses, the present disclosure provides a solution, so as to increase the sleep time of the UE and reduce the quantity of switches, thereby to reduce the power consumption of the UE caused by the waiting and switching. To be specific, the UE receives target DCI, and the target DCI is used to indicate time information of at least one of first uplink information or second uplink information. Then, the UE transmits first uplink information and second uplink information in accordance with the target DCI. The first uplink information and the second uplink information are transmitted at a same moment, or a time interval between a transmission time of the first uplink information and a transmission time of the second uplink information is smaller than or equal to a predefined time interval. When the first uplink information and the second uplink information are transmitted at a same moment, or the time interval between the transmission time of the first uplink information and the transmission time of the second uplink information is smaller than or equal to the predefined time interval, it is able to effectively increase the sleep time of the UE and reduce the power consumption caused by the switching, thereby to reduce the power consumption of the UE.

In order to make the objects, the technical solutions and the advantages of the present disclosure more apparent, the present disclosure will be described hereinafter in details in conjunction with the drawings and embodiments.

The expression "and/or" is merely used to describe the relationship between objects, and it includes three relationships. For example, "A and/or B" may represent that, there is only A, there are both A and B, and there is only B. Further, the symbol "/" usually refers to "or".

The expression "a plurality of" refers to two or more, and the other quantifiers are similar.

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

An object of the present disclosure is to provide an uplink information transmission method, an uplink information reception method, a UE and a network device, so as to reduce the power consumption of the UE.

The method and the device are provided on the basis of a same inventive concept, and a principle of the method for solving the problem is similar to that of the device, so the implementation of the device may refer to that of the method.

Schemes in the embodiments of the present disclosure may be applied to various systems, especially a $6^{th}$-Generation (6G) system, e.g., Global System of Mobile communication (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplexing (FDD) system, LTE Time Division Duplexing (TDD) system, Long Term Evolution Advanced (LTE-A) system, Universal Mobile Telecommunication System (UMTS), Worldwide Interoperability for Microwave Access (WiMAX) system, $5^{th}$-Generation (5G) New Radio (NR) system, or 6G system. Each of these systems includes a terminal device and a network device. Each system further includes a core network, e.g., an Evolved Packet System (EPS) or 5G system (5GS).

FIG. 2 shows applicable network architecture according to an embodiment of the present disclosure. As shown in FIG. 2, the network architecture includes a UE 21 and a network device 22.

The terminal device involved in the embodiments of the present disclosure is a device for providing voice data and/or any other service data to a user, e.g., a handheld device having a wireless connection function, or any other processing device capable of being connected to a wireless modem. In different systems, the terminal device may have different names. For example, in a 5G system, the terminal device is called as UE. A wireless terminal device communicates with one or more Core Networks (CNs) via a Radio Access Network (RAN). The wireless terminal device may be a mobile terminal, e.g., a mobile phone (or cellular phone), or a computer having the mobile terminal device, e.g., a portable, pocket-sized, handheld, built-in or vehicle-mounted mobile device, which are capable of exchanging voice and/or data with the RAN. For example, the wireless terminal device may be a Personal Communication Service (PCS) telephone, a cordless telephone, a Session Initiation Protocol (SIP) phone, a Wireless Local Loop (WLL) station, a Personal Digital Assistant (PDA), a redcap terminal device, or a Low Power Wide Area (LPWA). In addition, the wireless terminal device may also be called as system, subscriber unit, subscriber station, mobile station, mobile, remote station, access point, remote terminal, access terminal, user terminal, user agent or user device, which will not be particularly defined herein.

The network device involved in the embodiments of the present disclosure may be a base station which includes a plurality of cells providing services for the terminal. Depending on different application scenarios, the base station is called as an access point, a device in an access network in communication with the wireless terminal device through one or more sectors on an air interface, or any other name. The network device is used to exchange a received air frame with an Internet Protocol (IP) packet, and it serves as a router between the wireless terminal device and the other part of the access network. The other part of the access network includes an IP communication network. The network device may further coordinate attribute management on the air interface. For example, the network device involved in the embodiments of the present disclosure is a Base Transceiver Station (BTS) in the GSM or CDMA system, a NodeB in the WCDMA system, an evolutional Node B (eNB, or e-NodeB) in the LTE system, a 5G base station (gNB) in 5G network architecture (next generation system), a base station in 6G, a Home evolved Node B (HeNB), a relay node, a femto, or a pico, which will not be particularly defined herein. In some network structures, the network device includes a Centralized Unit (CU) and a Distributed Unit (DU), which may be geographically separated from each other.

Multi Input Multi Output (MIMO) transmission is performed between the network device and the terminal each with one or more antennae, and the MIMO transmission is Single User MIMO (SU-MIMO) or Multiple User MIMO (MU-MIMO). Depending on the form of an antenna combination and the quantity of antennae, the MIMO transmission may be 2D-MIMO, 3D-MIMO, FD-MIMO or massive-MIMO, and it may also be diversity transmission, precoding transmission or beam-forming transmission.

As shown in FIG. 3, the present disclosure provides in some embodiments an uplink information transmission method, which includes: Step 301 of receiving, by a UE, target DCI, the target DCI being used to indicate time information of at least one of first uplink information or second uplink information; and Step 302 of transmitting, by the UE, first uplink information and second uplink information in accordance with the target DCI. The first uplink information and the second uplink information are transmitted at a same moment, or a time interval between a transmission time of the first uplink information and a transmission time of the second uplink information is smaller than or equal to a predefined time interval.

The receiving the target DCI includes receiving DCI from a network device, and the DCI is used for scheduling at least one of DL transmission or UL transmission.

The target DCI indicates the time information of at least one of the first uplink information or the second uplink information, so that the first uplink information and the second uplink information are transmitted at a same moment or the time interval between the transmission time of the first uplink information and the transmission time of the second uplink information is smaller than or equal to the predetermined time interval. For example, when the target DCI indicates the time information of the first uplink information, the transmission time of the second uplink information is fixed, i.e., the time information of the first uplink information is configured with the transmission time of the second uplink information as an anchor or reference. For another example, when the target DCI indicates the time information of the second uplink information, the transmission time of the first uplink information is fixed, i.e., the time information of the second uplink information is configured with the transmission time of the first uplink information as an anchor or reference. For yet another example, the target DCI directly indicates the time information of the first uplink information and the second uplink information.

It should be appreciated that, when the target DCI indicates the time information of one of the first uplink information or the second uplink information, the time information of the other of the first uplink information or the second uplink information is configured any defined mode in a protocol, which will not be particularly defined herein.

When the first uplink information and the second uplink information are transmitted at a same moment, the first uplink information and the second uplink information are transmitted within a same slot or sub-slot or on a same symbol.

The predetermined time interval is predefined in the protocol or configured by the network device, so as to reduce the power consumption of the UE. For example, the predetermined time interval includes 1 or 2 slots, sub-slots or symbols. The predetermined time interval will not be particularly defined herein, and it may be set according to the practical needs.

In the embodiments of the present disclosure, through the above-mentioned steps, the first uplink information and the second uplink information are transmitted at a same moment, or the time interval between the transmission time of the first uplink information and the transmission time of the second uplink information is smaller than or equal to the predetermined time interval, so as to effectively increase a sleep time of the UE and reduce the power consumption for switching, thereby to reduce the power consumption of the UE.

In the embodiments of the present disclosure, the method is applied to an XR service, e.g., an Augmented Reality (AR), Mixed Reality (MR) or Virtual Reality (VR) service. Of course, in the embodiments of the present disclosure, the service will not be particularly defined herein, and the method may be applied to any service in which the uplink information is transmitted by the UE.

In a possible embodiment of the present disclosure, the first uplink information includes PDSCH ACK, and the second uplink information includes data carried on a first PUSCH.

The PDSCH ACK is carried on a Physical Uplink Control Channel (PUCCH) or a second PUSCH, wherein the first PUSCH is different from the second PUSCH.

In the embodiments of the present disclosure, the PDSCH ACK and the first PUSCH are transmitted at a same moment, or the time interval between the transmission time of the PDSCH ACK and the transmission time of the first PUSCH is smaller than or equal to the predetermined time interval, so as to effectively increase the sleep time of the UE and reduce the power consumption for switching, thereby to reduce the power consumption of the UE.

In a possible embodiment of the present disclosure, the target DCI is used to indicate at least one of the transmission time of the first uplink information, the transmission time of the second uplink information, a transmission time interval between the first uplink information and first target information, or a transmission time interval between the second uplink information and second target information.

The transmission time interval between the first uplink information and the first target information is a time interval between the transmission time of the first uplink information and a reception time of the first target information, e.g., a time interval between the transmission time of the first uplink information and a reception time of a PDSCH, or a time interval between the transmission time of the first uplink information and a transmission time of the first target information, e.g., a time interval between the transmission time of the first uplink information and the transmission time of the second uplink information. When the transmission time of the first uplink information is determined in accordance with the transmission time interval between the first uplink information and the first target information, the transmission time interval is configured with the transmission time or reception time of the first target information as an anchor or reference. When the target DCI merely includes the transmission time interval between the first uplink information and the first target information, the transmission time interval is configured with the transmission time or reception time of the first target information and the transmission time of the second uplink information as anchors or references.

The transmission time interval between the second uplink information and the second target information is a time interval between the transmission time of the second uplink information and a reception time of the second target information, e.g., a time interval between the transmission time of the second uplink information and a reception time of PDSCH, or a time interval between the transmission time of the second uplink information and a transmission time of the second target information, e.g., a time interval between the transmission time of the second uplink information and the transmission time of the first uplink information. When the transmission time of the second uplink information is determined in accordance with the transmission time interval between the second uplink information and the second target information, the transmission time interval is configured with the transmission time or reception time of the second target information as an anchor or reference. When the target DCI merely includes the transmission time interval between the second uplink information and the second target information, the transmission time interval is configured with the transmission time or reception time of the second target information and the transmission time of the first uplink information as anchors or references.

During the implementation, through at least one of the above, the first uplink information and the second uplink information are transmitted at a same moment, or the time interval between the transmission time of the first uplink information and the transmission time of the second uplink information is smaller than or equal to the predetermined time interval.

Optionally, the target DCI includes at least one of first time information of the first uplink information or second time information of the second uplink information, wherein the first time information is used to indicate at least one of the transmission time of the first uplink information or the transmission time interval between the first uplink information and the first target information, and the second time information is used to indicate at least one of the transmission time of the second uplink information or the transmission time interval between the second uplink information and the second target information.

During the implementation, merely the first time information is configured with the transmission time of the second uplink information as an anchor or reference, or with the transmission time of the second uplink information and the transmission or reception time of the first target information as anchors or references. In this way, through merely configuring the first time information, it is also able to transmit the first uplink information and the second uplink information at a same moment, or enable the time interval between the transmission time of the first uplink information and the transmission time of the second uplink information to be smaller than or equal to the predetermined time interval.

During the implementation, merely the second time information is configured with the transmission time of the first uplink information as an anchor or reference, or with the transmission time of the first uplink information and the transmission or reception time of the second target information as anchors or references. In this way, through merely configuring the second time information, it is also able to transmit the first uplink information and the second uplink information at a same moment, or enable the time interval between the transmission time of the first uplink information and the transmission time of the second uplink information to be smaller than or equal to the predetermined time interval.

Optionally, the target DCI includes third time information. The third time information is used to indicate at least one of: at least one of the transmission time of the first uplink information or the transmission time interval between the first uplink information and the first target information; or at least one of the transmission time of the second uplink information or the transmission time interval between the second uplink information and the second target information.

During the implementation, the third time information is able to transmit the first uplink information and the second uplink information at a same moment, or enable the time interval between the transmission time of the first uplink information and the transmission time of the second uplink information to be smaller than or equal to the predetermined time interval.

In a possible embodiment of the present disclosure, the transmission time interval between the first uplink information and the first target information includes at least one of a transmission time interval between a target PDSCH and the first uplink information, a transmission time interval between the target DCI and the first uplink information, or a transmission time interval between the second uplink information and the first uplink information.

At least one of the target PDSCH, the target DCI or the second uplink information is the first target information.

The target PDSCH is a specific PDSCH, e.g., a PDSCH related to the first uplink information. For example, the transmission time interval between the target PDSCH and the first uplink information is K1, i.e., a time interval between the transmission of the PDSCH and the transmission of the PDSCH ACK.

Based on at least one of the above, the transmission time of the first uplink information is configured. When the transmission time is configured with the transmission time of the second uplink information as an anchor or reference, it is merely necessary to configure the transmission time interval in the target DCI. Of course, in some embodiments of the present disclosure, the first time information of the first uplink information and the second time information of the second uplink information are directly configured in the target DCI.

In a possible embodiment of the present disclosure, the transmission time interval between the second uplink information and the second target information includes at least one of a transmission time interval between the target DCI and the second uplink information, the transmission time interval between the first uplink information and the second uplink information, or a transmission time interval between the second uplink information and a target PDSCH.

At least one of the target PDSCH, the target DCI and the first uplink information is the first target information.

The target PDSCH is a specific PDSCH, e.g., a PDSCH related to the first uplink information.

When the target DCI is scheduling signaling, the transmission time interval between the target DCI and the second uplink information is K2, i.e., a time interval between the scheduling signaling and the transmission time of the PUSCH.

Based on at least one of the above, the transmission time of the second uplink information is configured. When the transmission time is configured with the transmission time of the first uplink information as an anchor or reference, it is merely necessary to configure the transmission time interval in the target DCI. It should be noted that, in some embodiments of the present disclosure, first time information of the first uplink information and second time information of the second uplink information are directly configured in the target DCI.

In a possible embodiment of the present disclosure, the target DCI includes at least one of first DCI for simultaneously scheduling DL transmission and UL transmission, second DCI for scheduling the DL transmission, or third DCI for scheduling the UL transmission.

The first DCI may be used to simultaneously schedule the mixed scheduling information of the time information for the DL data transmission and the UL data transmission.

The second DCI is downlink scheduling information, and in some embodiments of the present disclosure, the second DCI is further used for time information for scheduling the UL transmission, i.e., the downlink scheduling information is used for the time information for scheduling the DL data transmission and the UL data transmission simultaneously.

The second DCI is uplink scheduling information, and in some embodiments of the present disclosure, the third DCI is further used for time information for scheduling the DL transmission, i.e., the uplink scheduling information is used for the time information for scheduling the DL data transmission and the UL data transmission simultaneously.

In some embodiments of the present disclosure, the first DCI includes the third time information, or includes the first time information and the second time information.

In some embodiments of the present disclosure, the second DCI may include first time information of the first uplink information, and the third DCI may include second time information of the second uplink information; or the second DCI may include second time information of the second uplink information, and the third DCI may include first time information of the first uplink information; or the second DCI may include first time information of the first uplink information and second time information of the second uplink information; or the third DCI may include second time information of the second uplink information and first time information of the first uplink information.

The description about the first time information, the second time information and third time information may refer to that mentioned hereinabove, and thus will not be particularly defined herein.

According to the embodiments of the present disclosure, the UE receives the target DCI, and the target DCI is used to indicate the time information of at least one of the first uplink information or the second uplink information. Then, the UE transmits the first uplink information and the second uplink information in accordance with the target DCI. The first uplink information and the second uplink information are transmitted at a same moment, or the time interval between the transmission time of the first uplink information and the transmission time of the second uplink information is smaller than or equal to the predefined time interval. As a result, it is able to effectively increase a sleep time of the UE and reduce power consumption for switching, thereby to reduce the power consumption of the UE.

As shown in FIG. 4, the present disclosure further provides in some embodiments an uplink information reception method which includes: Step 401 of transmitting, by a network device, target DCI, the target DCI being used to indicate time information of at least one of first uplink information or second uplink information; and Step 402 of receiving, by the network device, the first uplink information and the second uplink information in accordance with the target DCI. The first uplink information and the second uplink information are transmitted at a same moment, or a time interval between a transmission time of the first uplink information and a transmission time of the second uplink information is smaller than or equal to a predefined time interval.

Optionally, the first uplink information includes PDSCH ACK, and the second uplink information includes data carried on a first PUSCH.

Optionally, the target DCI is used to indicate at least one of the transmission time of the first uplink information, the transmission time of the second uplink information, a transmission time interval between the first uplink information and first target information, or a transmission time interval between the second uplink information and second target information.

Optionally, the target DCI includes at least one of first time information of the first uplink information or second time information of the second uplink information, wherein the first time information is used to indicate at least one of the transmission time of the first uplink information or the transmission time interval between the first uplink information and the first target information, and the second time information is used to indicate at least one of the transmission time of the second uplink information or the transmission time interval between the second uplink information and the second target information.

Optionally, the target DCI includes third time information, and the third time information is used to indicate at least one of: at least one of the transmission time of the first uplink information or the transmission time interval between the first uplink information and the first target information; or at least one of the transmission time of the second uplink information or the transmission time interval between the second uplink information and the second target information.

Optionally, the transmission time interval between the first uplink information and the first target information includes at least one of a transmission time interval between a target PDSCH and the first uplink information, a transmission time interval between the target DCI and the first uplink information, or a transmission time interval between the second uplink information and the first uplink information.

Optionally, the transmission time interval between the second uplink information and the second target information includes at least one of a transmission time interval between the target DCI and the second uplink information, the transmission time interval between the first uplink information and the second uplink information, or a transmission time interval between the second uplink information and a target PDSCH.

Optionally, the target DCI includes at least one of first DCI for simultaneously scheduling DL transmission and UL transmission, second DCI for scheduling the DL transmission, or third DCI for scheduling the UL transmission.

Optionally, the second DCI includes the first time information of the first uplink information, and the third DCI includes the second time information of the second uplink information; or the second DCI includes the second time information of the second uplink information, and the third DCI includes the first time information of the first uplink information; or the second DCI includes the first time information of the first uplink information and the second time information of the second uplink information; or the third DCI includes the second time information of the second uplink information and the first time information of the first uplink information.

Optionally, the second DCI is further used for time information for scheduling the UL transmission, and/or the third DCI is further used for time information for scheduling the DL transmission.

It should be appreciated that, the implementation of the uplink information reception method by a network device may refer to that of the uplink information transmission method in the embodiments of the present disclosure as shown in FIG. 3 with a same technical effect, which will not be particularly defined herein.

The following description will be illustratively given hereinafter in conjunction with the embodiments.

In the embodiments of the present disclosure, the following steps are performed by the network device: Step 1 of configuring the time information and the DCI; Step 2 of transmitting the DCI; Step 3 of transmitting data; and Step 4 of receiving feedback information indicating whether or not data has been received accurately, and receiving uplink data transmission information.

The following steps are performed by the UE: Step 1 of receiving the time information and DCI configured by the network device; Step 2 of receiving DL data information; and Step 3 of transmitting UL data information and feedback information indicating whether or not DL data has been received accurately.

In the embodiments of the present disclosure, the following parameter information is involved: the first time information; the second time information; the third time information; the second time information (the first time information, the second time information and the third time information are used to indicate the transmission time and/or time interval of the uplink information); first information including DCI for DL transmission and/or DCI for UL transmission, and specifically including the second DCI or the third DCI; second information including the above-mentioned target PDSCH; third information including the PDSCH ACK; fourth information including the PUSCH; and the fifth information including DCI carrying information for DL transmission and information for UL transmission, specifically including the first DCI.

The first time information includes at least one of first time information for indicating a transmission time of the third information, first time information for indicating a transmission time interval between the second information and the third information, first time information for indicating a transmission time interval between the first information and the third information, or first time information for indicating a transmission time interval between the fourth information and the third information.

The second time information includes at least one of second time information for indicating a transmission time of the fourth information, second time information for indicating a transmission time interval between the first information and the fourth information, second time information for indicating a transmission time interval between the third information and the fourth information, or second time information for indicating a transmission time interval between the fourth information and the second information.

The third time information includes at least one of third time information for indicating a transmission time of the third information and/or the fourth information, or third time information for indicating a transmission time interval between the first information and the third information, and/or a transmission time interval between the first information and the fourth information.

First Embodiment

In this embodiment, the third information and the fourth information are transmitted through first target time information, and time information of the third information and the fourth information is carried on the fifth information.

To be specific, the fifth information includes scheduling information of the second information, configuration information of the third information and scheduling information of the fourth information, or the fifth information includes scheduling information of the fourth information, configuration information of the second information and scheduling information of the third information, or the fifth information is a modified DCI format or a newly-defined DCI format.

The transmission time interval indicated through the first time information and the transmission time interval indicated through the second time information are indicated separately or jointly.

A transmission time of the third information indicated directly through the first time information or indicated through the transmission time interval, and a transmission time of the fourth information indicated directly through the second time information or indicated through the transmission time interval, are the first target time information.

Second Embodiment

In this embodiment, the third information is transmitted through second target time information, the fourth information is transmitted through third target time information, time information of the third information and the fourth information is carried in the fifth information, and a time interval between the second target time information and the third target time information meets a predetermined requirement.

To be specific, the second embodiment differs from the first embodiment in that the time interval between the second target time information and the third target time information meets the predetermined requirement, i.e., the time interval is not greater than the predetermined time interval.

Third Embodiment

In this embodiment, the first time information (e.g., K1) is carried in the first information, and the second time information (e.g., K2) is carried in the first information, so as to indicate that the third information and the fourth information to be transmitted in target time information. In this way, it is able to increase a sleep time of the UE and reduce power consumption for switching, thereby to reduce the power consumption of the UE.

To be specific, the first information includes at least one of DCI formats defined in the protocol, e.g., DCI format 0-0, 0-1, 0-2, 1-0, 1-1 or 1-2. The first time information (K1) is carried in first information, and the first information includes DCI for the DL transmission. The second time information (K2) is carried in first information, and the first information includes DCI for the UL transmission. The above two pieces of first information for carrying the first time information and the second time information are different from each other.

The target time information is used to identify the transmitted time information, and it includes at least one of information of a radio frame within which the time information is transmitted, information of a slot within which the time information is transmitted, or information of a symbol on which the time information is transmitted.

The indicating the third information and the fourth information to be transmitted in the target time information includes at least one of: fixing the first time information and configuring the second time information, so that the third information and the fourth information are transmitted through the target time information; fixing the second time information and configuring the first time information, so that the third information and the fourth information are transmitted through the target time information; or configuring the first time information and the second time information, so that the third information and the fourth information are transmitted through the target time information.

The fixing the first time information includes taking the first time information as an anchor or reference, and the fixing the second time information includes taking the second time information as an anchor or reference.

To be specific, the fixing the first time information and configuring the second time information so that the third information and the fourth information are transmitted through the target time information includes obtaining the target time information in accordance with the fixed first time information and configuring the second time information in accordance with the target time information.

To be specific, the second time information is configured through at least one of: directly configuring the second time information as the target time information, i.e., a transmission time; configuring a time interval between the first information and the fourth information, so that the fourth information is transmitted through the target time information; configuring a time interval between the third information and the fourth information, so that the fourth information is transmitted through the target time information; or configuring a time interval between the fourth information and the second information, so that the fourth information is transmitted through the target time information.

The first information carrying the second time information includes at least one of: that the second time information is carried through K bits, or that the second time information is directly indicated through the first information, or that a function relationship between the first time information and the second time information is configured.

Figure 5:
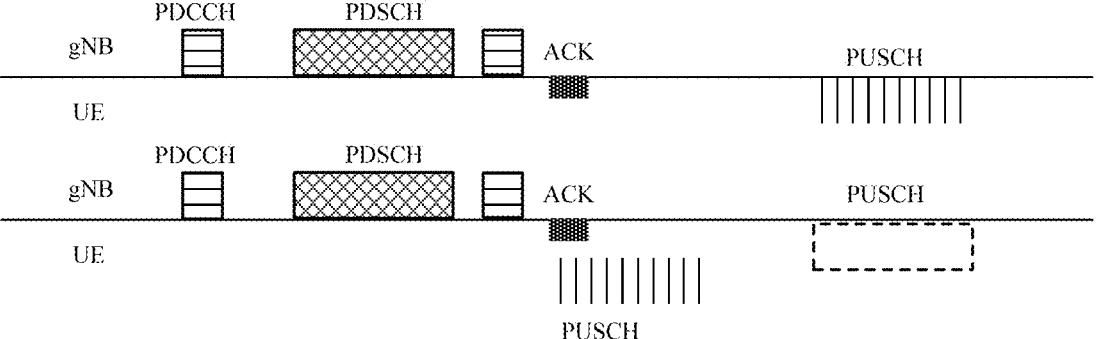
FIG. 5 is a schematic view showing information transmission according to an embodiment of the present disclosure.

For example, as shown in a first row in FIG. 5, when the mode in the embodiments of the present disclosure is not adopted, the ACK and the PUSCH are transmitted at intervals. When K1 is fixed and the time information of the PUSCH is configured, as shown in a second row in FIG. 5, the ACK and the PUSCH are transmitted through same time information. In FIG. 5, PDCCH refers to Physical Downlink Control Channel.

The fixing the second time information and configuring the first time information to enable the third information and the fourth information to be transmitted through the target time information includes obtaining the target time information in accordance with the fixed second time information and configuring the first time information in accordance with the target time information.

To be specific, the second time information is configured through at least one of: directly configuring the first time information as the target time information, i.e., a transmission time; configuring a time interval between the second information and the third information, so that the third information is transmitted through the target time information; configuring a time interval between the first information and the third information, so that the third information is transmitted through the target time information; or configuring a time interval between the fourth information and the third information, so that the third information is transmitted through the target time information.

The first information carrying the first time information includes at least one of: that the first time information is carried through K bits, or that the first time information is directly indicated through the first information, or that the second time information is indicated through Time Domain Resource Assignment (TDRA), e.g., the second time information may be configured as a function of the TDRA.

Figure 6:
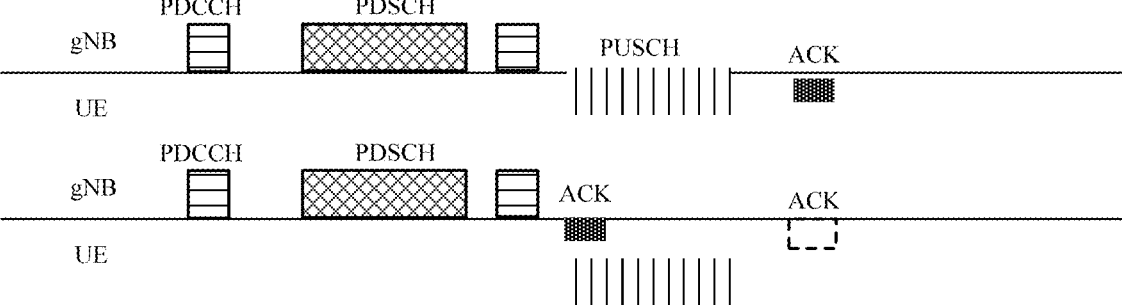
FIG. 6 is another schematic view showing the information transmission according to an embodiment of the present disclosure.

For example, as shown in a first row in FIG. 6, when the mode in the embodiments of the present disclosure is not adopted, the ACK and the PUSCH are transmitted at intervals. When K2 is fixed and the time information of the ACK is configured, as shown in a second row in FIG. 6, the ACK and the PUSCH are transmitted through same time information.

The configuring the first time information and the second time information to enable the third information and the fourth information to be transmitted through the target time information includes: directly configuring the first time information as the target time information, i.e., a transmission time; configuring a time interval between the second information and the third information, so that the third information is transmitted through the target time information; configuring a time interval between the first information and the third information, so that the third information is transmitted through the target time information; configuring a time interval between the fourth information and the third information, so that the third information is transmitted through the target time information; directly configuring the second time information as the first target information, i.e., a transmission time; configuring a time interval between the first information and the fourth information, so that the fourth information is transmitted through the target time information; configuring a time interval between the third information and the fourth information, so that the fourth information is transmitted through the target time information; and configuring a time interval between the fourth information and the second information, so that the fourth information is transmitted through the target time information.

In some embodiments of the present disclosure, the time information of the ACK and the PUSCH is directly configured. For example, as shown in first and second rows in FIG. 7, when the mode in the embodiments of the present disclosure is not adopted, the ACK and the PUSCH are transmitted at intervals. When the time information of the ACK and the PUSCH is configured directly, as shown in a third row in FIG. 7, the ACK and the PUSCH are transmitted through same time information.

Fourth Embodiment

In this embodiment, the first time information (K1) is carried in the first information so as to indicate that it is transmitted in fourth target time information, and the second time information (K2) is carried in the first information so as to indicate that it is transmitted in fifth target time information. A time interval between the fourth target time information and the fifth target time information meets the requirement of a first time interval. In this way, it is able to increase the sleep time of the UE and reduce the power consumption for switching, thereby to reduce the power consumption of the UE.

To be specific, the fourth embodiment differs from the first embodiment in that the time interval between the fourth target time information and the fifth target time information meets the requirement of the first time interval, i.e., the time interval between the fourth target time information and the fifth target time information is smaller than a threshold of the first time interval.

Fifth Embodiment

In this embodiment, the first time information (K1) is carried in the first information, and the second time information (K2) is carried in the first information, so as to indicate that it is transmitted in the target time information. In this way, it is able to increase the sleep time of the UE and reduce the power consumption for switching, thereby to reduce the power consumption of the UE.

To be specific, the fifth embodiment differs from the first embodiment in that: the first time information (K1) is carried in the first information, i.e., the first time information is carried in the first information for DL transmission, and the second time information (K2) is carried in the first information, i.e., the second time information is carried in the first information for DL transmission; or the first time information (K1) is carried in the first information, i.e., the first time information is carried in the first information for UL transmission, and the second time information (K2) is carried in the first information, i.e., the second time information is carried in the first information for UL transmission; or the first time information (K1) is carried in the first information, i.e., the first time information is carried in the first information for UL and DL transmission, and the second time information (K2) is carried in the first information, i.e., the second time information is carried in the first information for UL and DL transmission.

Sixth Embodiment

In this embodiment, the first time information (K1) is carried in the first information so as to indicate that it is transmitted in the first target time information, and the second time information (K2) is carried in the first information so as to indicate that it is transmitted in the second target time information. A time interval between the first target time information and the second target time information meets a requirement of a second time interval. In this way, it is able to increase the sleep time of the UE and reduce the power consumption for switching, thereby to reduce the power consumption of the UE.

The implementation in the sixth embodiment may refer to that in the second and third embodiments, and thus will not be particularly defined herein.

As shown in FIG. 8, the present disclosure further provides in some embodiments a UE, which includes a memory 820, a transceiver 800 and a processor 810. The memory 820 is configured to store therein a computer program, and the transceiver 800 is configured to receive and transmit data under the control of the processor 810. The processor 810 is configured to read the computer program in the memory 820, so as to: receive target DCI, the target DCI being used to indicate time information of at least one of first uplink information or second uplink information; and transmit the first uplink information and the second uplink information in accordance with the target DCI. The first uplink information and the second uplink information are transmitted at a same moment, or a time interval between a transmission time of the first uplink information and a transmission time of the second uplink information is smaller than or equal to a predefined time interval.

In FIG. 8, bus architecture may include any number of buses and bridges connected to each other, so as to connect various circuits for one or more processors 810 and one or more memories 820. In addition, as is known in the art, the bus architecture may be used to connect any other circuits, such as a circuit for a peripheral device, a circuit for a voltage stabilizer and a power management circuit. A bus interface may be provided, and the transceiver 800 may consist of a plurality of elements, i.e., a transmitter and a receiver for communication with any other devices over a transmission medium. The transmission medium includes a wireless channel, a wired channel, an optical cable, etc. With respect to different UEs, a user interface 830 may also be provided for devices which are to be arranged inside or outside the UE, and these devices may include but not limited to a keypad, a display, a speaker, a microphone and a joystick.

The processor 810 may take charge of managing the bus architecture as well as general processings. The memory 820 may store therein data for the operation of the processor 810.

Optionally, the processor 810 is a Central Processing Unit (CPU), an Application Specific Integrated Circuit (ASIC), a Field-Programmable Gate Array (FPGA) or a Complex Programmable Logic Device (CPLD). The processor may also use multi-core architecture.

The processor is configured to call the computer program in the memory to implement any one of the above-mentioned methods in accordance with obtained executable instructions. The processor may also be physically separated from the memory.

Optionally, the first uplink information includes PDSCH ACK, and the second uplink information includes data carried on a PUSCH.

Optionally, the target DCI is used to indicate at least one of the transmission time of the first uplink information, the transmission time of the second uplink information, a transmission time interval between the first uplink information and first target information, or a transmission time interval between the second uplink information and second target information.

Optionally, the target DCI includes at least one of first time information of the first uplink information or second time information of the second uplink information, wherein the first time information is used to indicate at least one of the transmission time of the first uplink information or the transmission time interval between the first uplink information and the first target information, and the second time information is used to indicate at least one of the transmission time of the second uplink information or the transmission time interval between the second uplink information and the second target information.

Optionally, the target DCI includes third time information. The third time information is used to indicate at least one of: at least one of the transmission time of the first uplink information or the transmission time interval between the first uplink information and the first target information; or at least one of the transmission time of the second uplink information or the transmission time interval between the second uplink information and the second target information.

Optionally, the transmission time interval between the first uplink information and the first target information includes at least one of a transmission time interval between a target PDSCH and the first uplink information, a transmission time interval between the target DCI and the first uplink information, or a transmission time interval between the second uplink information and the first uplink information.

Optionally, the transmission time interval between the second uplink information and the second target information includes at least one of a transmission time interval between the target DCI and the second uplink information, the transmission time interval between the first uplink information and the second uplink information, or a transmission time interval between the second uplink information and a target PDSCH.

Optionally, the target DCI includes at least one of first DCI for simultaneously scheduling DL transmission and UL transmission, second DCI for scheduling the DL transmission, or third DCI for scheduling the UL transmission.

Optionally, the second DCI includes first time information of the first uplink information, and the third DCI includes second time information of the second uplink information; or the second DCI includes second time information of the second uplink information, and the third DCI includes first time information of the first uplink information; or the second DCI includes first time information of the first uplink information and second time information of the second uplink information; or the third DCI includes second time information of the second uplink information and first time information of the first uplink information.

Optionally, the second DCI is further used for time information for scheduling the UL transmission, and/or the third DCI is further used for time information for scheduling the DL transmission.

It should be appreciated that, the UE in the embodiments of the present disclosure is capable of implementing the steps of the above-mentioned method with a same technical effect, which will thus not be further particularly defined herein.

As shown in FIG. 9, the present disclosure further provides in some embodiments a network device, which includes a memory 920, a transceiver 900 and a processor 910. The memory 920 is configured to store therein a computer program, and the transceiver 900 is configured to receive and transmit data under the control of the processor 910. The processor 910 is configured to read the computer program in the memory 920, so as to: transmit target DCI, the target DCI being used to indicate time information of at least one of first uplink information or second uplink information; and receive the first uplink information and the second uplink information in accordance with the target DCI. The first uplink information and the second uplink information are transmitted at a same moment, or a time interval between a transmission time of the first uplink information and a transmission time of the second uplink information is smaller than or equal to a predefined time interval.

In FIG. 9, bus architecture may include any number of buses and bridges connected to each other, so as to connect various circuits for one or more processors 910 and one or more memories 920. In addition, the bus architecture may be used to connect any other circuits, such as a circuit for a peripheral device, a circuit for a voltage stabilizer and a power management circuit. It is known in the art, and therefore, no further description is given herein. A bus interface may be provided, and the transceiver 900 may consist of a plurality of elements, i.e., a transmitter and a receiver for communication with any other devices over a transmission medium. The transmission medium includes a wireless channel, a wired channel, an optical cable, etc. With respect to different UEs, a user interface 930 may also be provided for devices which are to be arranged inside or outside the UE, and these devices may include but not limited to a keypad, a display, a speaker, a microphone and a joystick.

The processor 910 may take charge of managing the bus architecture as well as general processings. The memory 920 may store therein data for the operation of the processor 910.

Optionally, the processor 910 is a CPU, an ASIC, an FPGA or a CPLD. The processor may also use multi-core architecture.

The processor is configured to call the computer program in the memory to implement any one of the above-mentioned method in accordance with obtained executable instructions. The processor may also be physically separated from the memory.

Optionally, the first uplink information includes PDSCH ACK, and the second uplink information includes data carried on a PUSCH.

Optionally, the target DCI is used to indicate at least one of the transmission time of the first uplink information, the transmission time of the second uplink information, a transmission time interval between the first uplink information and first target information, or a transmission time interval between the second uplink information and second target information.

Optionally, the target DCI includes at least one of first time information of the first uplink information or second time information of the second uplink information, wherein the first time information is used to indicate at least one of the transmission time of the first uplink information or the transmission time interval between the first uplink information and the first target information, and the second time information is used to indicate at least one of the transmission time of the second uplink information or the transmission time interval between the second uplink information and the second target information.

Optionally, the target DCI includes third time information. The third time information is used to indicate at least one of: at least one of the transmission time of the first uplink information or the transmission time interval between the first uplink information and the first target information; or at least one of the transmission time of the second uplink information or the transmission time interval between the second uplink information and the second target information.

Optionally, the transmission time interval between the first uplink information and the first target information includes at least one of a transmission time interval between a target PDSCH and the first uplink information, a transmission time interval between the target DCI and the first uplink information, or a transmission time interval between the second uplink information and the first uplink information.

Optionally, the transmission time interval between the second uplink information and the second target information includes at least one of a transmission time interval between the target DCI and the second uplink information, the transmission time interval between the first uplink information and the second uplink information, or a transmission time interval between the second uplink information and a target PDSCH.

Optionally, the target DCI includes at least one of first DCI for simultaneously scheduling DL transmission and UL transmission, second DCI for scheduling the DL transmission, or third DCI for scheduling the UL transmission.

Optionally, the second DCI includes the first time information of the first uplink information, and the third DCI includes the second time information of the second uplink information; or the second DCI includes the second time information of the second uplink information, and the third DCI includes the first time information of the first uplink information; or the second DCI includes the first time information of the first uplink information and the second time information of the second uplink information; or the third DCI includes the second time information of the second uplink information and the first time information of the first uplink information.

Optionally, the second DCI further includes time information for scheduling the UL transmission, and/or the third DCI further includes time information for scheduling the DL transmission.

It should be appreciated that, the network device in the embodiments of the present disclosure is capable of implementing the steps of the above-mentioned method with a same technical effect, which will thus not be further particularly defined herein.

Figure 10:
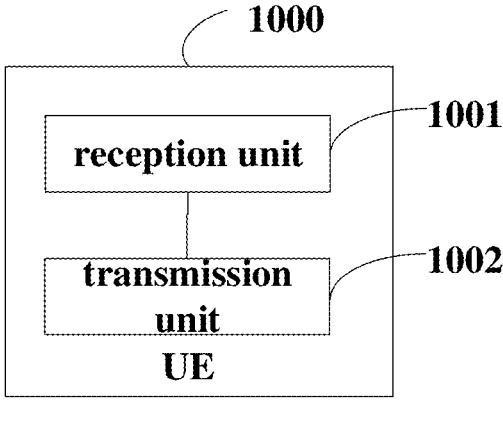
FIG. 10 is another block diagram of the UE according to an embodiment of the present disclosure.

As shown in FIG. 10, the present disclosure further provides in some embodiments a UE 1000 which includes: a reception unit 1001 configured to receive target DCI, the target DCI being used to indicate time information of at least one of first uplink information or second uplink information; and a transmission unit 1002 configured to transmit the first uplink information and the second uplink information in accordance with the target DCI. The first uplink information and the second uplink information are transmitted at a same moment, or a time interval between a transmission time of the first uplink information and a transmission time of the second uplink information is smaller than or equal to a predefined time interval.

Optionally, the first uplink information includes PDSCH ACK, and the second uplink information includes data carried on a PUSCH.

Optionally, the target DCI is used to indicate at least one of the transmission time of the first uplink information, the transmission time of the second uplink information, a transmission time interval between the first uplink information and first target information, or a transmission time interval between the second uplink information and second target information.

Optionally, the target DCI includes at least one of first time information of the first uplink information or second time information of the second uplink information, the first time information is used to indicate at least one of the transmission time of the first uplink information or the transmission time interval between the first uplink information and the first target information, and the second time information is used to indicate at least one of the transmission time of the second uplink information or the transmission time interval between the second uplink information and the second target information.

Optionally, the target DCI includes third time information. The third time information is used to indicate at least one of: at least one of the transmission time of the first uplink information or the transmission time interval between the first uplink information and the first target information; or at least one of the transmission time of the second uplink information or the transmission time interval between the second uplink information and the second target information.

Optionally, the transmission time interval between the first uplink information and the first target information includes at least one of a transmission time interval between a target PDSCH and the first uplink information, a transmission time interval between the target DCI and the first uplink information, or a transmission time interval between the second uplink information and the first uplink information.

Optionally, the transmission time interval between the second uplink information and the second target information includes at least one of a transmission time interval between the target DCI and the second uplink information, the transmission time interval between the first uplink information and the second uplink information, or a transmission time interval between the second uplink information and a target PDSCH.

Optionally, the target DCI includes at least one of first DCI for simultaneously scheduling DL transmission and UL transmission, second DCI for scheduling the DL transmission, or third DCI for scheduling the UL transmission.

Optionally, the second DCI includes the first time information of the first uplink information, and the third DCI includes the second time information of the second uplink information; or the second DCI includes the second time information of the second uplink information, and the third DCI includes the first time information of the first uplink information; or the second DCI includes the first time information of the first uplink information and the second time information of the second uplink information; or the third DCI includes the second time information of the second uplink information and the first time information of the first uplink information.

Optionally, the second DCI is further used for time information for scheduling the UL transmission, and/or the third DCI further includes time information for scheduling the DL transmission.

It should be appreciated that, the UE in the embodiments of the present disclosure is capable of implementing the steps of the above-mentioned method with a same technical effect, which will not be particularly defined herein.

Figure 11:
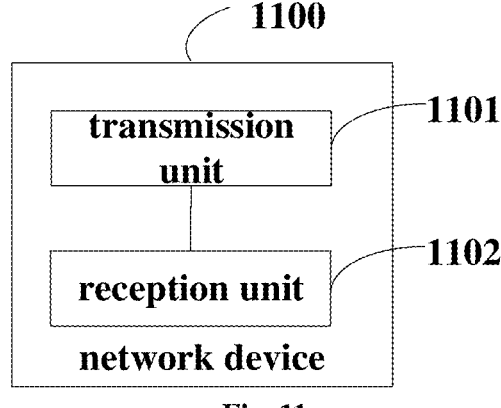
FIG. 11 is another block diagram of the network device according to an embodiment of the present disclosure.

As shown in FIG. 11, the present disclosure provides in some embodiments a network device 1100, which includes: a transmission unit 1101 configured to transmit target DCI, the target DCI being used to indicate time information of at least one of first uplink information or second uplink information; and a reception unit 1102 configured to receive the first uplink information and the second uplink information in accordance with the target DCI. The first uplink information and the second uplink information are transmitted at a same moment, or a time interval between a transmission time of the first uplink information and a transmission time of the second uplink information is smaller than or equal to a predefined time interval.

Optionally, the first uplink information includes PDSCH ACK, and the second uplink information includes data carried on a PUSCH.

Optionally, the target DCI is used to indicate at least one of the transmission time of the first uplink information, the transmission time of the second uplink information, a transmission time interval between the first uplink information and first target information, or a transmission time interval between the second uplink information and second target information.

Optionally, the target DCI includes at least one of first time information of the first uplink information or second time information of the second uplink information, the first time information is used to indicate at least one of the transmission time of the first uplink information or the transmission time interval between the first uplink information and the first target information, and the second time information is used to indicate at least one of the transmission time of the second uplink information or the transmission time interval between the second uplink information and the second target information.

Optionally, the target DCI includes third time information. The third time information is used to indicate at least one of: at least one of the transmission time of the first uplink information or the transmission time interval between the first uplink information and the first target information; or at least one of the transmission time of the second uplink information or the transmission time interval between the second uplink information and the second target information.

Optionally, the transmission time interval between the first uplink information and the first target information includes at least one of a transmission time interval between a target PDSCH and the first uplink information, a transmission time interval between the target DCI and the first uplink information, or a transmission time interval between the second uplink information and the first uplink information.

Optionally, the transmission time interval between the second uplink information and the second target information includes at least one of a transmission time interval between the target DCI and the second uplink information, the transmission time interval between the first uplink information and the second uplink information, or a transmission time interval between the second uplink information and a target PDSCH.

Optionally, the target DCI includes at least one of first DCI for simultaneously scheduling DL transmission and UL transmission, second DCI for scheduling the DL transmission, or third DCI for scheduling the UL transmission.

Optionally, the second DCI includes the first time information of the first uplink information, and the third DCI includes the second time information of the second uplink information; or the second DCI includes the second time information of the second uplink information, and the third DCI includes the first time information of the first uplink information; or the second DCI includes the first time information of the first uplink information and the second time information of the second uplink information; or the third DCI includes the second time information of the second uplink information and the first time information of the first uplink information.

Optionally, the second DCI further includes time information for scheduling the UL transmission, and/or the third DCI further includes time information for scheduling the DL transmission.

It should be appreciated that, the network device in the embodiments of the present disclosure is capable of implementing the steps of the above-mentioned method with a same technical effect, which will not be particularly defined herein.

It should be appreciated that, the units in the embodiments of the present disclosure are for illustrative purposes, and they are provided merely on the basis of their logic functions. The units may be integrated in a processing unit, or physically separated from each other, or two or more units may be integrated in one unit. The integrated units may be implemented in the form of hardware or a software functional unit.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a Read-Only Memory (ROM), a Random Access Memory (RAM), a magnetic disk or an optical disk.

The present disclosure further provides in some embodiments a processor-readable storage medium storing therein a computer program. The computer program is executed by a processor, so as to implement the above-mentioned uplink information transmission method or uplink information reception method.

The processor-readable storage medium may be any available medium or data storage device capable of being accessed by a processor, which includes, but not limited to, a magnetic memory (e.g., floppy disk, hard disk, magnetic tape, or Magnetic Optical disk (MO)), an optical memory (e.g., Compact Disk (CD), Digital Video Disk (DVD), Blue-ray Disk (BD), or High-definition Versatile Disk (HVD)), or a semiconductor memory (e.g., ROM, Electrically Programmable ROM (EPROM), Electrically Erasable PROM (EEPROM), NAND flash, or Solid-State Disk (SSD)).

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It should be further appreciated that, the above modules in the network device and the UE are divided merely on the basis of their logic functions, and in actual use, they may be completely or partially integrated into a physical entity, or physically separated from each other. These modules may be implemented by calling software through a processing element, or implemented in the form of hardware. For example, a module may be a processing element arranged separately, or integrated into a chip of the above-mentioned device. In addition, the module may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules, units, sub-units or sub-modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, there are both A and C, and there are A, B and C. Similarly, the phrase "at least one of A or B" in the specification and the appended claims shall be understood as "there is only A, there is only B, or there are both A and B".

A person skilled in the art can make various modifications and variations to the present disclosure without departing from the spirit and scope of the present disclosure. Thus, if these modifications and variations of the present disclosure fall within the scope of the present disclosure and its equivalent technologies as defined by the claims, then the present disclosure also intends to include these modifications and variations.

What is claimed is:

1. An uplink information transmission method, comprising:

receiving, by a User Equipment (UE), target Downlink Control Information (DCI), the target DCI being used to indicate time information of at least one of first uplink information or second uplink information;

transmitting, by the UE, the first uplink information and the second uplink information in accordance with the target DCI, wherein the first uplink information and the second uplink information are transmitted at a same moment; or a time interval between a transmission time of the first uplink information and a transmission time of the second uplink information is smaller than or equal to a predefined time interval.

2. The uplink information transmission method according to claim 1, wherein the first uplink information comprises Physical Downlink Shared Channel (PDSCH) Acknowledgement (ACK);

the second uplink information comprises data carried on a first Physical Uplink Shared Channel (PUSCH).

3. The uplink information transmission method according to claim 1, wherein the target DCI is used to indicate at least one of:

the transmission time of the first uplink information;

the transmission time of the second uplink information;

a transmission time interval between the first uplink information and first target information; or a transmission time interval between the second uplink information and second target information.

4. The uplink information transmission method according to claim 3, wherein the target DCI comprises at least one of:

first time information of the first uplink information; or second time information of the second uplink information;

wherein the first time information is used to indicate at least one of the transmission time of the first uplink information or the transmission time interval between the first uplink information and the first target information;

the second time information is used to indicate at least one of the transmission time of the second uplink information or the transmission time interval between the second uplink information and the second target information.

5. The uplink information transmission method according to claim 3, wherein the target DCI comprises:

third time information, wherein the third time information is used to indicate at least one of:

at least one of the transmission time of the first uplink information or the transmission time interval between the first uplink information and the first target information; or at least one of the transmission time of the second uplink information or the transmission time interval between the second uplink information and the second target information.

6. The uplink information transmission method according to claim 4, wherein the transmission time interval between the first uplink information and the first target information comprises at least one of:

a transmission time interval between a target PDSCH and the first uplink information;

a transmission time interval between the target DCI and the first uplink information; or a transmission time interval between the second uplink information and the first uplink information.

7. The uplink information transmission method according to claim 4, wherein the transmission time interval between the second uplink information and the second target information comprises at least one of:

a transmission time interval between the target DCI and the second uplink information;

the transmission time interval between the first uplink information and the second uplink information; or a transmission time interval between the second uplink information and a target PDSCH.

8. The uplink information transmission method according to claim 1, wherein the target DCI comprises at least one of:

first DCI for simultaneously scheduling Downlink (DL) transmission and Uplink (UL) transmission;

second DCI for scheduling the DL transmission; or third DCI for scheduling the UL transmission.

9. The uplink information transmission method according to claim 8, wherein the second DCI comprises first time information of the first uplink information; the third DCI comprises second time information of the second uplink information; or the second DCI comprises second time information of the second uplink information; the third DCI comprises first time information of the first uplink information; or the second DCI comprises first time information of the first uplink information and second time information of the second uplink information; or the third DCI comprises second time information of the second uplink information and first time information of the first uplink information.

10. The uplink information transmission method according to claim 8, wherein the second DCI is further used for time information for scheduling the UL transmission; and/or the third DCI is further used for time information for scheduling the DL transmission.

11. An uplink information reception method, comprising:

transmitting, by a network device, target Downlink Control Information (DCI), the target DCI being used to indicate time information of at least one of first uplink information or second uplink information;

receiving, by the network device, the first uplink information and the second uplink information in accordance with the target DCI, wherein the first uplink information and the second uplink information are transmitted at a same moment; or a time interval between a transmission time of the first uplink information and a transmission time of the second uplink information is smaller than or equal to a predefined time interval.

12. The uplink information reception method according to claim 11, wherein the first uplink information comprises Physical Downlink Shared Channel (PDSCH) Acknowledgement (ACK);

the second uplink information comprises data carried on a first Physical Uplink Shared Channel (PUSCH).

13. The uplink information reception method according to claim 11, wherein the target DCI is used to indicate at least one of:

the transmission time of the first uplink information;

the transmission time of the second uplink information;

a transmission time interval between the first uplink information and first target information; or a transmission time interval between the second uplink information and second target information.

14. The uplink information reception method according to claim 13, wherein the target DCI comprises at least one of:

first time information of the first uplink information; or second time information of the second uplink information;

wherein the first time information is used to indicate at least one of the transmission time of the first uplink information or the transmission time interval between the first uplink information and the first target information;

the second time information is used to indicate at least one of the transmission time of the second uplink information or the transmission time interval between the second uplink information and the second target information.

15. The uplink information reception method according to claim 13, wherein the target DCI comprises:

third time information, wherein the third time information is used to indicate at least one of:

at least one of the transmission time of the first uplink information or the transmission time interval between the first uplink information and the first target information; or at least one of the transmission time of the second uplink information or the transmission time interval between the second uplink information and the second target information.

16. The uplink information reception method according to claim 14, wherein the transmission time interval between the first uplink information and the first target information comprises at least one of:

a transmission time interval between a target PDSCH and the first uplink information;

a transmission time interval between the target DCI and the first uplink information; or a transmission time interval between the second uplink information and the first uplink information.

17. The uplink information reception method according to claim 14, wherein the transmission time interval between second uplink information and the second target information comprises at least one of:

a transmission time interval between the target DCI and the second uplink information, the transmission time interval between the first uplink information and the second uplink information, or a transmission time interval between the second uplink information and a target PDSCH.

18. The uplink information reception method according to claim 11, wherein the target DCI comprises at least one of:

first DCI for simultaneously scheduling Downlink (DL) transmission and Uplink (UL) transmission;

second DCI for scheduling the DL transmission; or third DCI for scheduling the UL transmission.

19. A User Equipment (UE), comprising a memory, a transceiver and a processor, wherein the memory is configured to store therein a computer program, and the transceiver is configured to receive and transmit data under the control of the processor, wherein the processor is configured to read the computer program in the memory to:

receive target Downlink Control Information (DCI), the target DCI being used to indicate time information of at least one of first uplink information or second uplink information;

transmit the first uplink information and the second uplink information in accordance with the target DCI, wherein the first uplink information and the second uplink information are transmitted at a same moment, or a time interval between a transmission time of the first uplink information and a transmission time of the second uplink information is smaller than or equal to a predefined time interval.

20. A network device, comprising a memory, a transceiver and a processor, wherein the memory is configured to store therein a computer program; and the transceiver is configured to receive and transmit data under the control of the processor;

wherein the processor is configured to read the computer program in the memory to implement the uplink inform reception method according to claim 11.

\* \* \* \* \*